Oct. 22, 1940.  H. LEAL  2,218,758
MACHINE AND METHOD FOR MANUFACTURING REINFORCED FABRIC
Filed July 15, 1939  5 Sheets-Sheet 1

INVENTOR.
Hugh Leal
BY Earl D. Chappell
ATTORNEYS

Oct. 22, 1940.   H. LEAL   2,218,758
MACHINE AND METHOD FOR MANUFACTURING REINFORCED FABRIC
Filed July 15, 1939   5 Sheets-Sheet 2

INVENTOR.
Hugh Leal
BY Earl T. Chappell
ATTORNEYS

Oct. 22, 1940.     H. LEAL     2,218,758
MACHINE AND METHOD FOR MANUFACTURING REINFORCED FABRIC
Filed July 15, 1939     5 Sheets-Sheet 3

INVENTOR.
Hugh Leal
BY Earl D. Chappell
ATTORNEYS

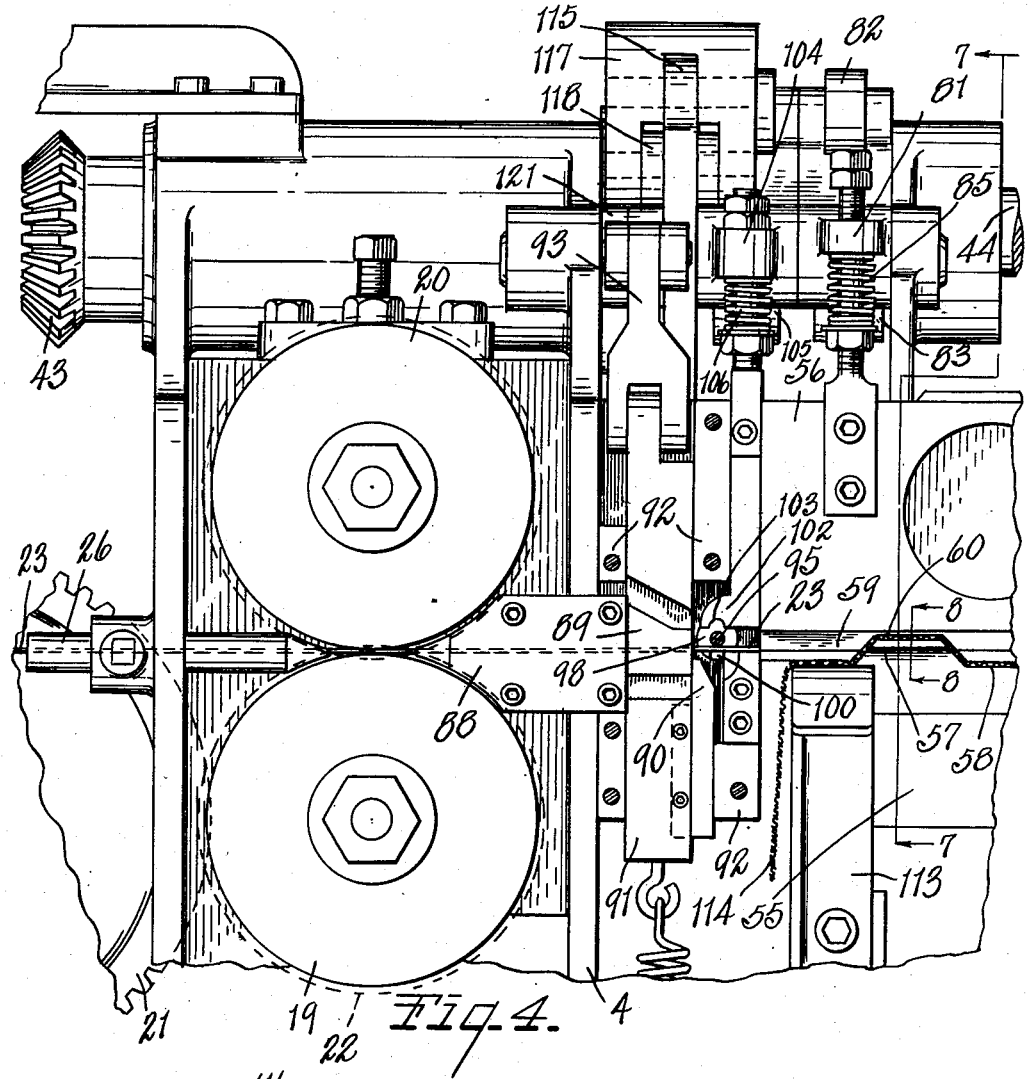

Oct. 22, 1940.  H. LEAL  2,213,758
MACHINE AND METHOD FOR MANUFACTURING REINFORCED FABRIC
Filed July 15, 1939  5 Sheets-Sheet 5
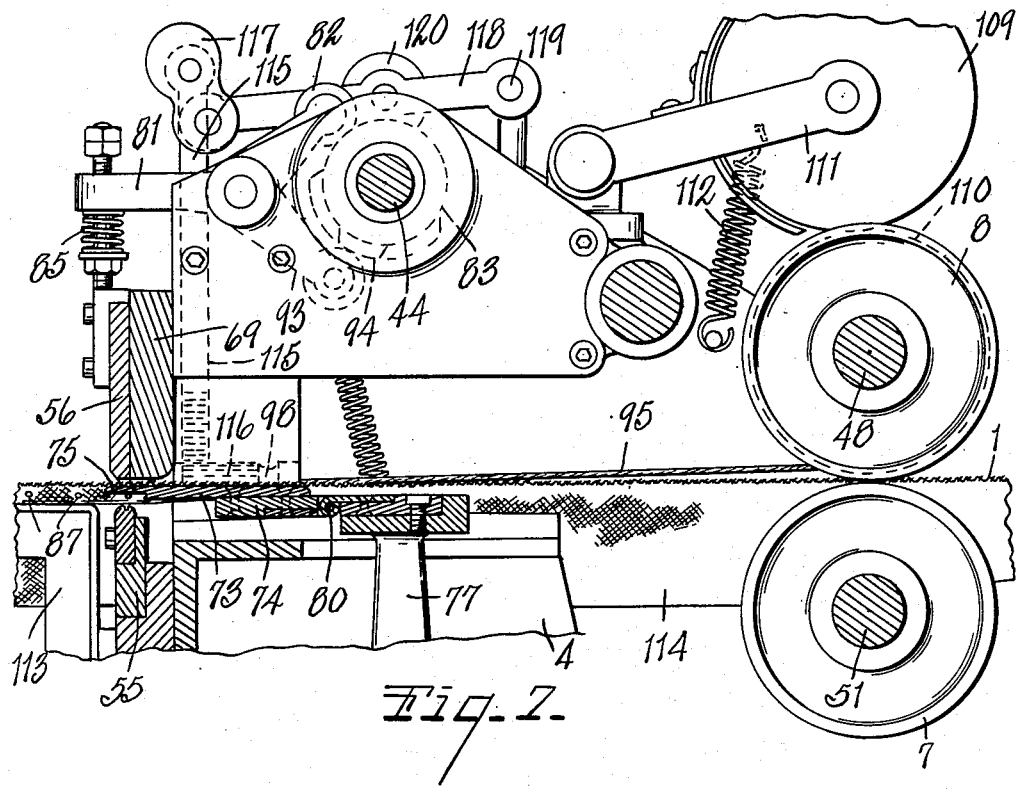
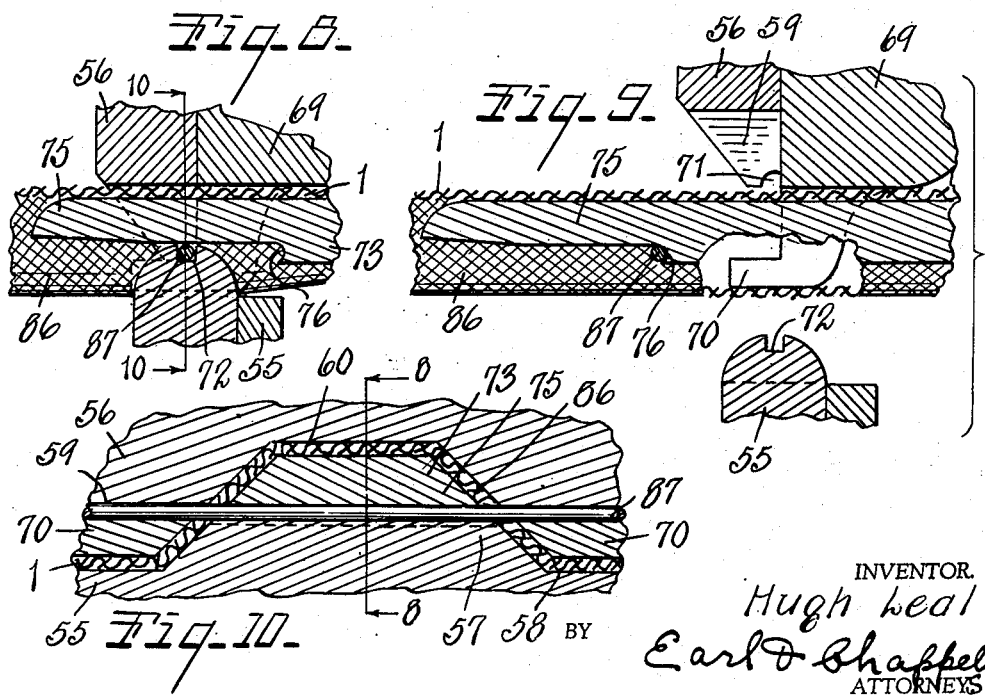
INVENTOR.
Hugh Leal
BY Earl D. Chappell
ATTORNEYS Patented Oct. 22, 1940

2,218,758

UNITED STATES PATENT OFFICE 2,218,758

MACHINE AND METHOD FOR MANUFACTURING REINFORCED FABRIC

Hugh Leal, Windsor, Ontario, Canada, assignor to L. A. Young Spring & Wire Corporation, Detroit, Mich.

Application July 15, 1939, Serial No. 284,589

31 Claims. (Cl. 140—3)

This invention relates to improvements in machine and method for manufacturing reinforced fabric.

The main objects of this invention are:

First, to provide a machine for the manufacture of reinforced fabric suitable for use in upholstery particularly to be superimposed upon a supporting spring unit or assembly to receive and effectively support the padding.

Second, to provide a machine of this character which if of large capacity and at the same time produces a uniform and highly satisfactory product.

Third, to provide a machine of the class described with improved means for interweaving resilient wire reinforcing strands in a previously woven fabric.

Fourth, to provide a machine of the class described means for effectively anchoring or securing the ends of the reinforcing strands to flexible longitudinal tie members.

Fifth, to provide a machine for the manufacture of fabric reinforced by resilient wire strands which is entirely automatic in its operation and requires no previous preparation of the fabric to receive the reinforcing strands.

Sixth, to provide in a machine of the class described a guide means for the reinforcing strands as they are wove through the fabric to engage the fabric at a plurality of spaced points.

Seventh, to provide an improved method of applying reinforcing strands to fabric.

Further objects pertaining to details and economies of my invention will definitely appear from the description to follow. The invention is defined in the claims.

A machine embodying the features of this invention is clearly illustrated in the accompanying drawings, in which:

Fig. 4 is an enlarged fragmentary view of certain parts shown in Fig. 1, particularly the reinforcing strand feeding cut off and one of the tie members.

Fig. 5 is an enlarged fragmentary view in section on line 5—5 of Fig. 6 showing details of one of the tie or knotter members.

Fig. 6 is an enlarged detail view in section on line 6—6 of Fig. 5.

Fig. 7 is a fragmentary view in section on line 7—7 of Fig. 4.

Fig. 8 is an enlarged fragmentary view in section on line 8—8 of Figs. 4 and 10 showing details of the reinforcing strand guide and the feed means.

Fig. 9 is a fragmentary view of parts shown in Fig. 8 in another position from that shown in that figure.

Fig. 10 is a fragmentary view in section on line 10—10 of Fig. 8.

Figure 1:
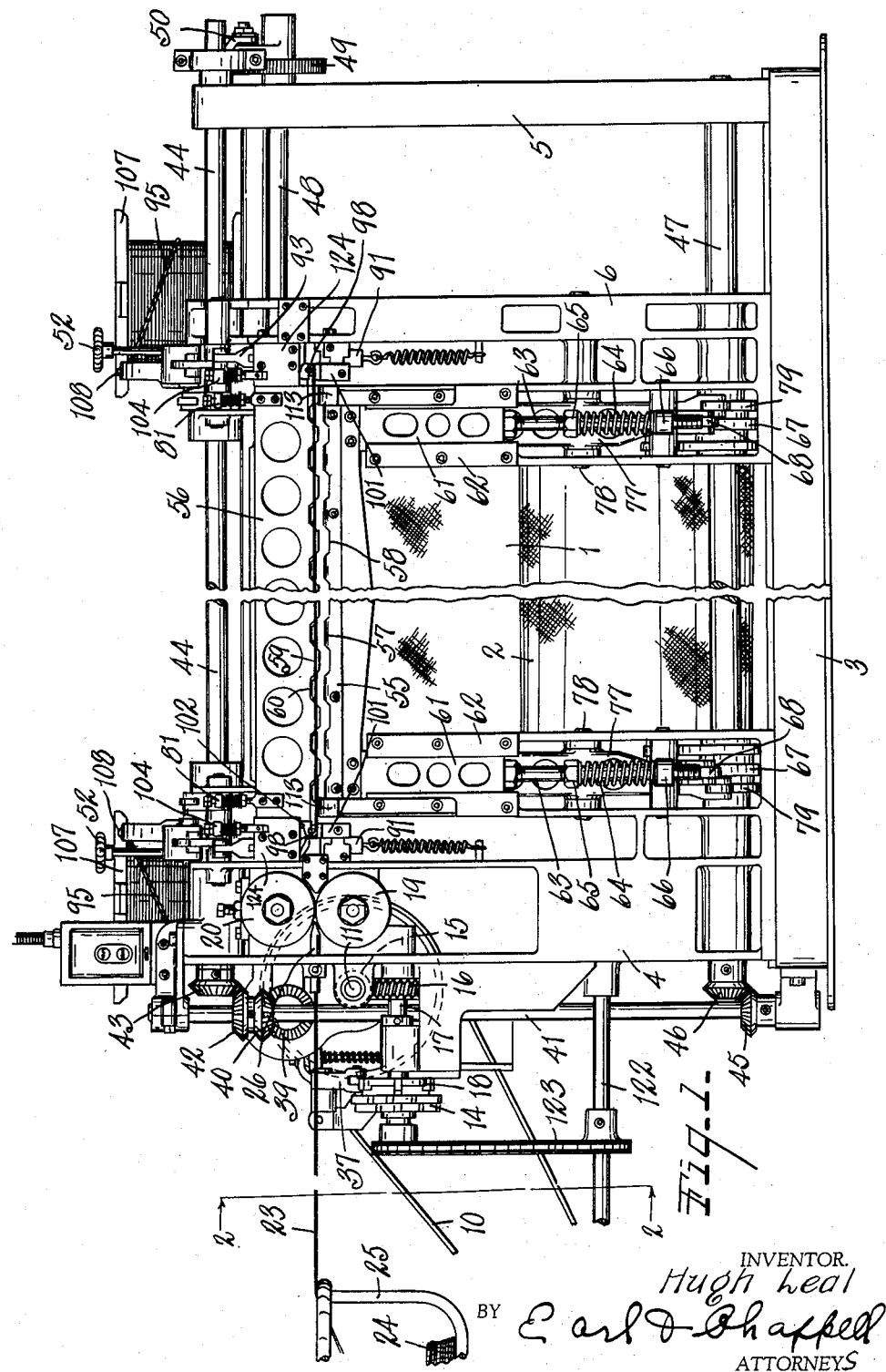
Fig. 1 is a fragmentary front elevation of a machine embodying the features of my invention with the guide members for the reinforcing strands in open position.

In the embodiment of my invention illustrated the fabric, which is of any suitable character (burlap being quite extensively used) is ordinarily supplied in webs 1 and preferably in roll form as indicated at 2. This fabric is of suitable width for the particular use to which it is to be put, as it will be obvious that if the mats or reinforced fabrics are to be used in mattresses considerable width is required as compared to use in automobile cushions and upholstery for upholstered furniture generally.

The machine illustrated is designed to be adjusted and comprises suitable bed or base member 3 adapted to support the operating parts. At one side the base carries an upright or pedestal designated generally by the numeral 4 and at the opposite side a supporting upright 5, see Fig. 1. The upright or pedestal member 6 is adjustably mounted on the base but the details of this mounting are not illustrated as they form no part of this invention.

The fabric web is drawn from the roll by coacting feed rollers 7 and 8 which are driven with a step by step movement as will appear from the description to follow. In this embodiment the machine is driven from a motor 9, see Fig. 2, connected by the belt 10 to the main driving shaft 11. This main drive shaft is connected to the driven shaft 12 sleeved thereon by means of the clutch designated generally by the numeral 13. This clutch is intermittently actuated from the cam 14 which is driven from the worm 15 on the shaft 11. This worm 15 meshes with a worm gear 16 on the shaft 17 carrying the cam 14 and also a second cam 18. The cam 14 is made up of two members relatively adjustable to control the length of wire feed. This provides a wide range of timing for the reinforcing strand feed which consists of a pair of coacting feed rollers 19 and 20 which are driven from the shaft 12 having a gear 21 thereon constituting part of a train of gears designated generally by the numeral 22, see Figs. 1, 2 and 4.

The wire stock 23 from which the reinforcing strands are cut is drawn from a coil 24 supported by the reel 25. A guide 26 is disposed in advance of the feed rollers to guide the wire through the feed rollers, feeding the wire to the fabric which is properly supported to receive the same.

The main driving shaft 11 is provided with a gear 27 meshing with a gear 28 which is rotatably mounted on the shaft 29 which is provided with a clutch designated generally by the numeral 30 for connecting the gear to the shaft 29. The clutch 13 is actuated from the cam 14 by means of the rocker 31 supported on the shaft 32 and connected by the link 33 to the shifting lever 34 of the clutch 13, see Fig. 2. The clutch 30 is controlled by the cam 18 which acts upon the rocker 35 also supported by the shaft 32. This rocker is connected by the link 36 to the shifting arm 37 for the clutch 30, this arm being pivoted at 38.

The shaft 29 is provided with a beveled gear 39 which meshes with a gear 40 on the vertical shaft 41. The gear 40 in the embodiment illustrated has a gear 42 formed integrally therewith which in turn meshes with a gear 43 on the transverse shaft 44. The shaft 41 has a beveled gear 45 at its lower end and meshes with a beveled gear 46 on the transverse shaft 47, the shafts 44 and 47 having various cams thereon, the purpose of which will appear as the description proceeds.

The feed roller 8 is mounted on the shaft 48 which is driven from the shaft 44 by means of a ratchet mechanism consisting of a ratchet wheel 49 on the shaft 48 and a coacting ratchet device designated generally by the numeral 50. The details of this ratchet device are not illustrated but it functions to drive the shaft 48, and consequently the roller 8, with a step by step movement. The coacting feed roller 7 on the shaft 51 is not driven but serves as a supporting roller in opposition to the driven roller 8. The driven feed rollers 8 are preferably provided with a knurled face to provide effective driving engagement with the fabric. Screws 52 are provided for adjusting the feeding pressure of the feed rollers but as the details of mounting the shaft for such adjustment forms no part of this invention they are not illustrated herein.

Figure 2:
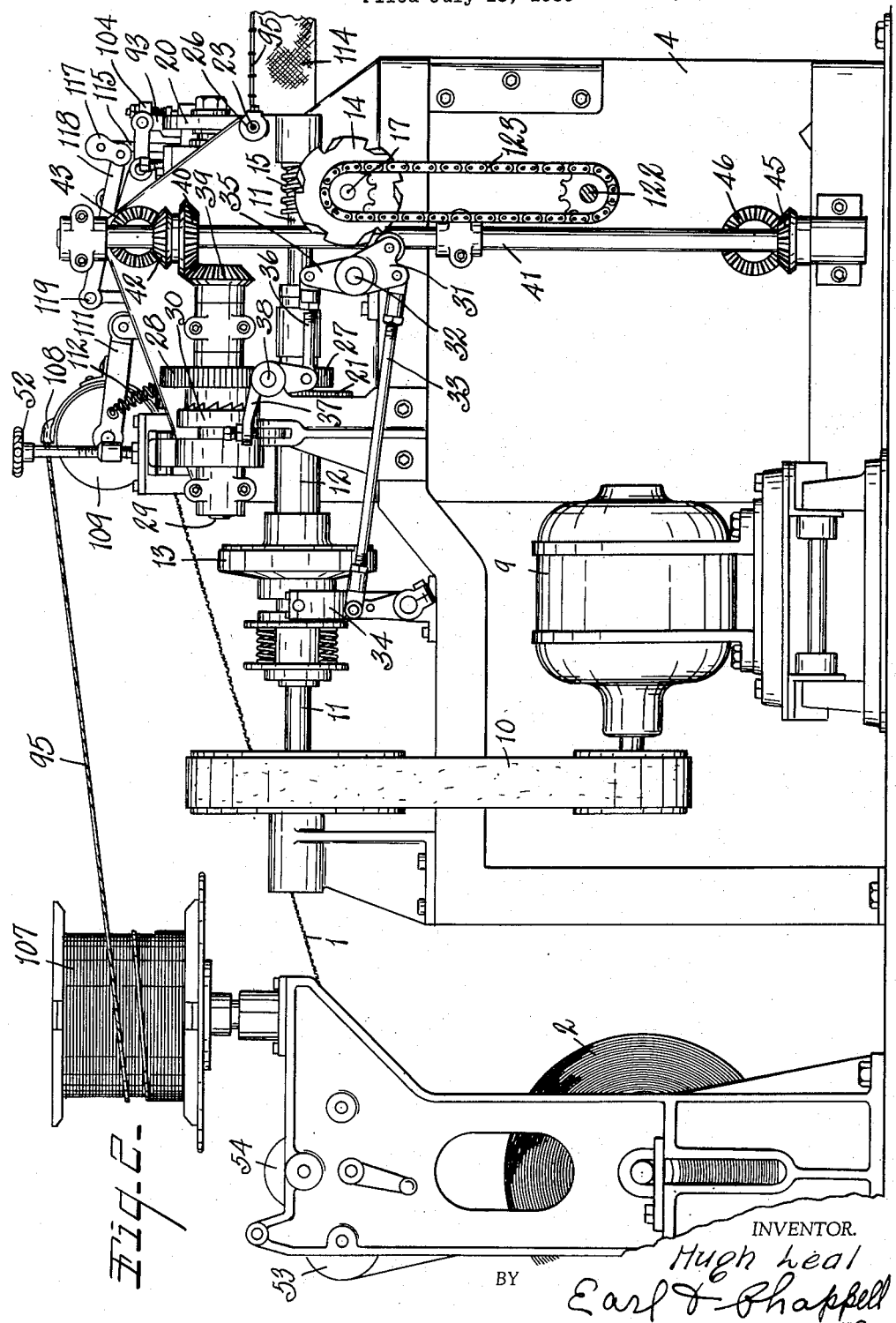
Fig. 2 is a fragmentary side elevation looking from the left of Fig. 1 sectioned on line 2—2 of Fig. 1.

The web of fabric is pulled from the roll by the feed rollers and passes around the rollers 53 and 54, see Fig. 2, so that it is presented in distended form to means for supporting it in position to receive the reinforcing strand, that is, it is conformed to provide a plurality of flute-like portions which are effectively supported so that the reinforcing strands may be wove therethrough or these flutes pierced by the reinforcing strands as they are introduced into the web.

To accomplish this I provide a pair of mating conforming heads or bars 55 and 56. The bottom member 55 has a series of raised portions 57 alternating with depressed portions 58. The top member 56 is provided with raised portions 59 alternating with depressed portions 60. The lower conforming member 55 is supported by a pair of slides 61 supported in the ways 62 for vertical movement. These slides are provided with push rods 63 having springs 64 thereon abutting the thrust members 65 at their upper ends and engaged by the rocker arm 66 so that the upward thrust is through the springs, the tension of which may be adjusted by means of the thrust member 65 which is threaded upon the push rod. The rocker arm 66 is actuated from a cam 67 coacting with the roller 68 on the rocker arm which is of the bell crank type. Both slides are actuated by the same type of mechanism, the cams being on the shaft 47 driven as I have described.

The upper forming member 56 is shown in Fig. 9 in relation to a third forming member 69 which is relatively fixed and has forwardly projecting tongue-like rests 70 adapted to support the reinforcing strands in opposition to the guiding grooves 71 formed on the projecting portions 59 of the conforming member 56. The member 55 is provided with guiding grooves 72 in its raised portions 57, see the open position in Fig. 9 and the closed position in Figs. 8 and 10.

The fabric is further guided, supported and conformed by the spaced reciprocatingly mounted guide and conforming members 73 mounted on a crosshead 74 and terminating in projecting fingers 75 which are in alinement with the recesses 59 of the member 56. The members 73 serve as feed members and are provided with thrust shoulders 76 which successively engage the reinforcing strands after they have been inserted in the fabric and carry the work forward step by step, thus insuring that there is no pile-up of the work at the point of insertion of the strands and also keeping the fabric taut between the feed rolls and the point of insertion of the strands. This insures a uniform spacing of the reinforcing strands.

Th crosshead 74 is actuated by the arm 77 which is pivoted at 78 and actuated by the cam 79 on the shaft 47. To avoid tilting of the members 73 as they are reciprocated by the arm 77 the crosshead 74 is pivotally connected to the arm at 80, see Fig. 7.

Figure 3:
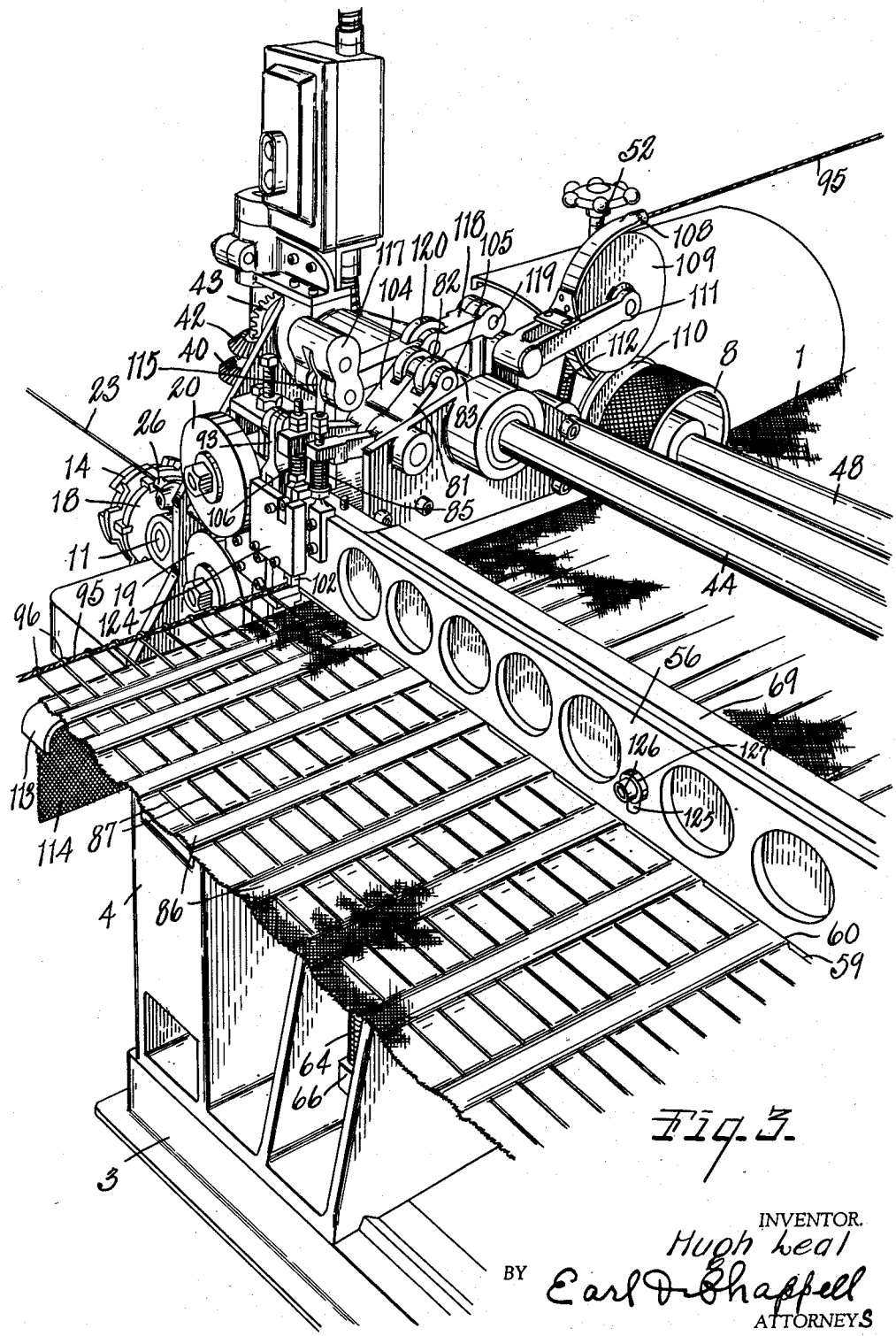
Fig. 3 is a fragmentary perspective view showing certain details of the fabric supporting and reinforcing strand guiding means.

The conforming member 56 is actuated by the rocker arm 81 provided with a roller 82 cooperating with a cam 83 on the main shaft 44, see Figs. 3 and 7. A coiled thrust spring 85 is provided to apply yielding pressure to the member 56 when in its actuated position, the purpose of this being to accommodate varying thicknesses of material and to insure a firm but yielding engagement.

As the fabric is advanced through the means described it is conformed to provide the spaced pleats or flutes 86 as best shown in Figs. 3 and 6, the members 55, 56, 69 and 73 all coacting to conform the fabric and to hold it with the flutes therein as shown in Figs. 8 and 10 while the reinforcing strands are fed through or interwoven with the fabric. The individual reinforcing strands are designated by the numeral 87 but, as stated, they are formed from the stock 23 and preferably of resilient wire of suitable gage.

During this operation of weaving or inserting the reinforcing strands the fabric is inserted at all the points receiving the strand or through which the strand is inserted, see Fig. 10, so that the strand is easily inserted, that it, it is not necessary to form perforations to receive the strand, the strand itself being easily pushed through or piercing the single ply of fabric. During this operation the strands are completely guided by means of the guiding grooves 72 in the members 55, the guiding grooves 71 in the members 56, and the supporting members 70, these various grooves and supports complementing each other to provide a substantially continuous guiding groove which prevents any distortion of the reinforcing strand which is fed from the feed rollers 19 and 20 through a guide block 88 and through the shear block 89.

The cutter 90 is carried by the slide 91 which is supported in suitable ways 92 and reciprocated in properly timed relation from the rocker arm 93 cooperating with a cam 94 on the shaft 44. The severed piece of stock becomes a reinforcing strand.

While the reinforcing strand is in this position its ends are knotted or coiled around the longitudinal tie members 95. These longitudinal tie members are cords of fibrous material and the knots or coils 96 of the strands are tightly wrapped around the longitudinal tie members so as to partially embed the coils 96 as shown at 97 in Fig. 6, thereby preventing any sliding movement of the strands relative to the longitudinal members. Further, the strands are held in properly spaced relation by the longitudinal members which, being formed of fibrous material or cord, are readily flexible between the strands. In other words, the ends of the strands, while held in properly spaced relation, are flexibly connected.

The knotting or tying is effected by means of the rotary knotting or tying members 98 which have central openings 99 therein through which the tie members are passed, see Figs. 5 and 6, the knotters being provided with wrapping lugs 100 which wrap the ends of the reinforcing strands around the longitudinal tie members as clearly shown in Fig. 5.

To support the tie members 95 in proper position to have the reinforcing strand wrapped thereon I provide a support 101 to which the tie members are clamped by means of the clamp 102 which has a recess 103 in its face of somewhat less dimension that the tie member so that when this clamp is in actuated position the tie member is firmly held in opposed relation to the knotter, see Fig. 6. This clamp 102 is mounted in a suitable slideway and is actuated in properly timed relation by means of the rocker 104 actuated from the cam 105 on the main shaft 44. The clamp 102 is yieldingly urged to clamping position by the coiled spring 106, see Fig. 4, which secures the desired clamping engagement without liability of breaking or injuring parts or material.

The longitudinal tie members are drawn from spools 107 suitable supported, and are passed through guides 108 to the feed rollers 109 and 110. These feed rollers have grooved faces which serve to retain the members and provide effective delivery thereof. The roller 110 is on the shaft 48 and is a driven roller. The roller 109 is a floating pressure roller, being carried by the swinging arm 111 which is urged toward the roller 108 by means of the coiled spring 112, see Figs. 3 and 7.

As will be noted from Fig. 7, the longitudinal tie member is delivered to the tying point in approximately parallel relation to the fabric as it is advanced by the feed rollers. As the forming members 55 and 56 are retracted the crosshead 74 is actuated to forcibly advance the tied reinforcing strand, insuring the disengagement of its ends with the support members 101 or carrying the knotted ends over these members. As this actuation takes place after each strand is introduced and knotted, the reinforce fabric is positively advanced one step or the distance between a pair of the strands. Means may be provided for rolling up the reinforced fabric, such means not being illustrated. Or, if preferred, the reinforced fabric may be allowed to fold or pile up at the rear of the machine.

It will be observed that guide members 113 are provided at each side of the machine for supporting the fabric adjacent its edges and apron portions 114 are provided depending at the outside of these supports. It is commonly desired that the reinforced fabric be provided with unreinforced portions or aprons such as they are designated to facilitate attachment and arrangement in the cushion structure. It will be understood that while for manufacturing convenience the fabric is preferably in the form of a continuous web of substantial length, the reinforced fabric is cut into desired widths or sections.

The knotter wheels are driven in timed relation by means of reciprocating racks 115 which coact with gears or pinions 116 on the knotters. The upper ends of the racks are connected by links 117 to the rocking levers 118 pivoted at 119 and provided with a roller 120 coacting with a cam 121. The reel 25 is preferably driven from the shaft 122, the driving connections for the shaft to the reel not being illustrated. The shaft 122 has a suitable driving connection to the shaft 17 by means of suitable chain and sprocket drive designated generally by the numeral 123. The purpose of driving the reel is to relieve the feed rolls 19 and 20 of the load to which they would otherwise be subjected if they were required to pull the stock from the reel or coil.

I have shown the stock in Fig. 1 as having a straight reach between the reel and the guides, but ordinarily it will be understood that there will be some slack at this point.

The forming member 56 is supported for limited vertical movement by means of the end guides 124 which are mounted at the ends of the fixed forming member 69, which also serves as a portion of the slideways for the cutter slide 91 and the clamp member 102. To prevent springing and bowing of the member 56, which is preferably as light as practical, it is provided with vertical slots 125 receiving the pins 126 on the member 69, the pins having heads 127 engaging the outer side of the member 56.

Certain of the drive means, clutches and the like have not been illustrated and described in detail as such details form no part of the present invention. However, I believe I have illustrated and described such parts with sufficient detail to enable those skilled in the art to make desired adaptations.

The machine illustrated is well adapted for practicing the method of my invention which, broadly stated, consists of forming the fabric into a series of spaced raised welts or offsets and clampingly supporting it in this position while the reinforcing strands are fed through these raised or offset portions. Inasmuch as the reinforcing strands are only required to pierce the single layer of fabric, no difficulty is experienced in inserting the same.

The machine illustrated is very satisfactory in that it has large capacity and is capable of producing a very uniform product. It will be noted that the reinforcing strands are all engaged with the longitudinal tie members so that the ends of the coils or knots wrapped around the longitudinal tie members are directed inwardly and are in direct alinement with the longitudinal portions of the tie member so that there are no sharp projections presented such as might be objectionable as injuring or wearing upholstery.

I have illustrated and described my improvements in a very practical embodiment. I have not attempted to illustrate or describe certain modifications and adaptations which I contemplate as it is believed this disclosure will enable the embodiment or adaptation of my invention as may be desired.

Having thus described my invention what I claim as new and desire to secure by Letters Patent is:

1. In a machine of the class described, the combination of means for conforming a web or strip of fabric to provide a plurality of laterally spaced offset strand receiving portions, means for clampingly supporting the fabric and the offsets therein transversely of the path of travel of the fabric for receiving a reinforcing strand, means for feeding the fabric with a step by step movement, means for feeding reinforcing strands through the offset portions of the fabric while the fabric is at rest and while its offsets are individually supported in offset position, means for delivering longitudinal tie members of flexible fibrous material at each side of said fabric conforming and supporting means, rotary knotter elements through which the strands are fed acting to wrap the ends of the strands closely about the tie members, and clamping means for supporting the tie members adjacent the point of tying during the tying operation.

2. In a machine of the class described, the combination of means for conforming a web or strip of fabric to provide a plurality of laterally spaced offset strand receiving portions, means for clampingly supporting the fabric and the offsets therein transversely of the path of travel of the fabric for receiving a reinforcing strand, means for feeding the fabric with a step by step movement, means for feeding reinforcing strands through the offset portions of the fabric while the fabric is at rest and while its offsets are individually supported in offset position, means for delivering longitudinal tie members at each side of said fabric conforming and supporting means, and rotary knotter elements through which the strands are fed acting to wrap the ends of the strands about the tie members.

3. In a machine of the class described, the combination of means for conforming a web or strip of fabric to provide a plurality of laterally spaced offset strand receiving portions, means for clampingly supporting the fabric and the offsets therein transversely of the path of travel of the fabric for receiving a reinforcing strand, means for feeding the fabric with a step by step movement, means for feeding reinforcing strands through the offset portions of the fabric while the fabric is at rest and while its offsets are individually supported in offset position, the supporting means being provided with guide means for the reinforcing strands, means for delivering longitudinal tie members at each side of said fabric conforming and supporting means, and rotary knotter elements through which the strands are fed acting to wrap the ends of the strands about the tie members.

4. A machine of the class described comprising means for conforming and clampingly supporting fabric to be reinforced to form therein a plurality of offset reinforcing strand receiving portions, means for feeding the fabric to said conforming means step by step, means for actuating said conforming means to retract the same during the fabric feeding step, means for feeding reinforcing strands through the offset portions of the fabric while it is supported by its said conforming means, the portions of the fabric through which the strand is fed being spaced so that the strand is inserted therethrough singly, means for supporting and guiding the strand as it is fed through the portions of the fabric supported to receive the same, means for disposing a pair of separate flexible fibrous tie members adjacent the sides of the fabric, and means for successively wrapping the ends of the strands around the tie members with the wraps around the tie members in embedding engagement therewith to thereby connect the tie members and prevent relative longitudinal movement of the strands, the embedding of the strands in the tie members preventing movement of the strands longitudinally of the tie members at the strand ends.

5. A machine of the class described comprising means for conforming and clampingly supporting fabric to be reinforced to form therein a plurality of offset reinforcing strand receiving portions, means for feeding the fabric to said conforming means step by step, means for actuating said conforming means to retract the same during the fabric feeding step, means for feeding reinforcing strands through the offset portions of the fabric while it is supported by its said conforming means, the portions of the fabric through which the strand is fed being spaced so that the strand is inserted therethrough singly, means for disposing a pair of separate flexible fibrous tie members adjacent the sides of the fabric, and means for successively wrapping the ends of the strands around the tie members with the wraps around the tie members in embedding engagement therewith to thereby connect the tie members and prevent relative longitudinal movement of the strands, the embedding of the strands in the tie members preventing movement of the strands longitudinally of the tie members at the strand ends.

6. A machine of the class described comprising means for conforming and clampingly supporting fabric to be reinforced to form a plurality of flute-like offset reinforcing strand receiving portions, means for feeding reinforcing strands through the offset portions of the fabric while it is engaged by its said conforming means, means for supporting and guiding the strand as it is fed through the portions of the fabric supported to receive the same, means for disposing independent and unconnected longitudinal tie members adjacent the ends of the strands, and means for successively wrapping the ends of the strands around the longitudinal tie members to connect the latter to one another and to the fabric.

7. A machine of the class described comprising means for conforming and clampingly supporting fabric to be reinforced to form therein a plurality of flute-like offset reinforcing strand receiving portions, means for feeding reinforcing strands through the offset portions of the fabric while it is engaged by its said conforming means, means for disposing independent and unconnected longitudinal tie members adjacent the ends of the strands, and means for successively wrapping the ends of the strands around the longitudinal tie members to connect the latter to one another and to the fabric.

8. In a machine of the class described, the combination with means for advancing a web or strip of fabric to be reinforced step by step, of opposed reciprocating means for forming a plurality of strand receiving offsets in the fabric, means for actuating said forming means to form the offsets and support the offset portions to receive a reinforcing strand, means for feeding a reinforcing strand through the offset portions of the fabric while they are so supported, the forming means being provided with alined reinforcing strand guides which are alined when the forming members are in actuated position, means disposed immediately adjacent the ends of the strands for supporting separate flexible tie members at those points, and means to embeddingly wrap said ends around the supported tie members to connect the latter to one another and prevent movement of the strands longitudinally relative to one another or relative to the tie member.

9. In a machine of the class described, the combination with means for advancing a web or strip of fabric to be reinforced step by step, of opposed reciprocating means for forming a plurality of strand receiving offsets in the fabric, means for actuating said forming means to form the offsets and support the offset portions to receive a reinforcing strand, means for feeding a reinforcing strand through the offset portions of the fabric while they are so supported, means disposed immediately adjacent the ends of the strands for supporting separate flexible tie members at those points, and means to embeddingly wrap said ends around the supported tie members to connect the latter to one another and prevent movement of the strands longitudinally relative to one another or relative to the tie member.

10. In a machine of the class described, the combination with means for supporting and advancing a web or strip of fabric to be reinforced, of opposed forming members having alternating projections and recesses adapted when actuated to produce a plurality of spaced offsets in the fabric and support the fabric at the offsets and between the offsets, means for feeding a reinforcing strand through the offset portions of the fabric while they are so supported, means for supporting longitudinal tie members at the ends of the strands, means for wrapping the ends of the strands around the tie members while so supported, and horizontally reciprocating forming members operatively associated with said opposed forming members, said horizontally reciprocating forming members being adapted to engage an inserted strand for the purpose of advancing the fabric to a position to receive another strand.

11. In a machine of the class described, the combination with means for supporting and advancing a web or strip of fabric to be reinforced, of means adapted to produce a plurality of spaced offsets in the fabric and support the fabric at the offsets, means for feeding a reinforcing strand through the offset portions of the fabric while they are so supported, means for supporting longitudinal fibrous tie members at points immediately adjacent the ends of the strands, and means for wrapping the ends of the strands around the tie members to embed the strands in the tie members while so supported.

12. In a machine of the class described, the combination with means for supporting and advancing a web or strip of fabric to be reinforced, of means adapted to produce a plurality of offsets in the fabric, means for feeding a reinforcing strand through the offset portions of the fabric, means for supporting longitudinal tie members at points immediately adjacent the ends of the strands, and means for wrapping the ends of the strands around the tie members to embed the strands in the tie members while so supported.

13. In a machine of the class described, the combination with feed rolls for feeding a web or strip of fabric, of a vertically reciprocating lower forming and supporting member arranged below the path of travel of the fabric and provided with a series of alternating projections and recesses, the projections having alined reinforcing strand guide grooves therein, a relatively fixed upper forming member provided with forwardly facing lugs alined with the projections of the said upper forming member and underlying the same, said lugs constituting reinforcing strand supporting members, the projections of the upper forming member being provided with recesses coacting with said lugs to provide guide grooves complementary to the guide grooves of said lower forming member, horizontally reciprocating forming members having forwardly projecting fingers adapted to extend into the recesses of the upper forming member in overlying relation to the projections of the lower forming member, said horizontally reciprocating forming members having forwardly facing feed shoulder projections for engagement with the strands when the reciprocating members are actuated on their feeding stroke, and means for feeding reinforcing strands through the portions of the fabric supported in crossing relation to the guide means of said forming members.

14. In a machine of the class described, the combination with feed rolls for feeding a web or strip of fabric, of a vertically reciprocating lower forming and supporting member arranged below the path of travel of the fabric and provided with a series of alternating projections and recesses, the projections having alined reinforcing strand guide grooves therein, a relatively fixed upper forming member provided with forwardly facing lugs alined with the projections of the said upper forming member and underlying the same, said lugs constituting reinforcing strand supporting members, the projections of the upper forming member being provided with recesses coacting with said lugs to provide guide grooves complementary to the guide grooves of said lower forming member, horizontally reciprocating forming members having forwardly projecting fingers adapted to extend into the recesses of the upper forming member in overlying relation to the projections of the lower forming member, and means for feeding reinforcing strands through the portions of the fabric supported in crossing relation to the guide means of said forming members.

15. In a machine of the class described, the combination with feed rolls for feeding a web or strip of fabric, of a vertically reciprocating lower forming and supporting member arranged below the path of travel of the fabric and provided with a series of alternating projections and recesses, a relatively fixed upper forming member provided with forwardly facing lugs alined with the projections of the said upper forming member and underlying the same, horizontally reciprocating forming members having forwardly projecting fingers adapted to extend into the recesses of the upper forming member in overlying relation to the projections of the lower forming member, said horizontally reciprocating forming members having forwardly facing feed shoulder projections for engagement with the strands when the reciprocating members are actuated on their feeding stroke, and means for feeding reinforcing strands through portions of the fabric supported by the forming member in angular relation to the path of travel of the fabric.

16. In a machine of the class described, the combination with feed rolls for feeding a web or strip of fabric, of a vertically reciprocating lower forming and supporting member arranged below the path of travel of the fabric and provided with a series of alternating projections and recesses, a relatively fixed upper forming member provided with forwardly facing lugs alined with the projections of the said upper forming member and underlying the same, horizontally reciprocating forming members having forwardly projecting fingers adapted to extend into the recesses of the upper forming member in overlying relation to the projections of the lower forming member, and means for feeding reinforcing strands through portions of the fabric supported by the forming member in angular relation to the path of travel of the fabric.

17. In a machine of the class described, the combination with means for conforming fabric to be reinforced to provide a plurality of offset portions spaced transversely of the fabric, of means for inserting reinforcing strands through the said offset portions while the fabric is at rest comprising a pair of reinforcing strand stock feed rolls, a guide block disposed at the rear of said rolls, a shear block alined with said guide block, a cutter coacting with said shear block, rotary knotter members disposed at each side of the path of travel of the fabric and in alinement with the shear block so that the severed reinforcing strand is delivered to both of the knotters in initial knotting position, said knotter members having central openings therein adapted to receive flexible longitudinal cord-like tie members, means for clampingly supporting said tie members at the rear of and adjacent to said knotters, means for actuating said knotters and supporting means in timed relation whereby the reinforcing strands are wrapped around said tie members in clamping engagement therewith, and reciprocating feed members for feeding the fabric step by step through engagement with a reinforcing strand at a plurality of spaced points.

18. In a machine of the class described, the combination with means for conforming fabric to be reinforced to provide a plurality of offset portions spaced transversely of the fabric, of means for inserting reinforcing strands through the said offset portions while the fabric is at rest comprising a pair of reinforcing strand stock feed rolls, a guide block disposed at the rear of said rolls, a shear block aligned with said guide block, a cutter coacting with said shear block, rotary knotter members disposed at each side of the path of travel of the fabric and in alinement with the shear block so that the severed reinforcing strand is delivered to both of the knotters in initial knotting position, said knotter members having central openings therein adapted to receive flexible longitudinal cord-like tie members, means for clampingly supporting said tie members at the rear of and adjacent to said knotters, and means for actuating said knotters and supporting means in timed relation whereby the reinforcing strands are wrapped around said tie members in clamping engagement therewith.

19. In a machine of the class described, the combination with means for conforming fabric to be reinforced to provide a plurality of offset portions spaced transversely of the fabric, of means for inserting reinforcing strands through the said offset portions while the fabric is at rest comprising a pair of reinforcing strand stock feedrolls, a guide block disposed at the rear of said rolls, a shear block alined with said guide block, a cutter coacting with said shear block, rotary knotter members disposed at each side of the path of travel of the fabric and in alinement with the shear block so that the severed reinforcing strand is delivered to both of the knotters in initial knotting position, said knotter members having central openings therein adapted to receive flexible longitudinal cord-like tie members, means for clampingly supporting said tie members at the rear of and adjacent to said knotters, means for feeding said tie members so that they are delivered to said knotters in approximately the plane of the fabric to be reinforced, and means for actuating said knotters and supporting means in timed relation whereby the reinforcing strands are wrapped around said tie members in clamping engagement therewith.

20. In a machine of the class described, the combination with means for conforming fabric to be reinforced to provide a plurality of offset portions spaced transversely of the fabric, of means for inserting reinforcing strands through the said offset portions of the fabric, rotary knotter members disposed at each side of the path of travel of the fabric to receive the reinforcing strand in initial knotting position as it is inserted through said offsets, said knotter members having central openings therein adapted to receive longitudinal tie members, means for clampingly supporting said tie members at the rear of and adjacent to said knotters, means for actuating said knotters and supporting means in timed relation whereby the reinforcing strands are wrapped around said tie members in clamping engagement therewith, and auxiliary means for feeding the fabric step by step through engagement with a reinforcing strand.

21. In a machine of the class described, the combination with means for conforming fabric to be reinforced to provide a plurality of offset portions spaced transversely of the fabric, of means for inserting reinforcing strands through the said offset portions of the fabric, rotary knotter members disposed at each side of the path of travel of the fabric to receive the reinforcing strand in initial knotting position as it is inserted through said offsets, said knotter members having central openings therein adapted to receive longitudinal tie members, means for clampingly supporting said tie members at the rear of and adjacent to said knotters, and means for actuating said knotters and supporting means in timed relation whereby the reinforcing strands are wrapped around said tie members in clamping engagement therewith.

22. In a machine of the class described, the combination with means for conforming fabric to be reinforced to provide a plurality of offset portions spaced transversely of the fabric, of means for inserting reinforcing strands through the said offset portions of the fabric, rotary knotter members disposed at each side of the path of travel of the fabric to receive the reinforcing strand in initial knotting position as it is inserted through said offsets, said knotter members having central openings therein adapted to receive longitudinal tie members, and means for actuating said knotters and supporting means in timed relation whereby the reinforcing strands are wrapped around said tie members in clamping engagement therewith.

23. In a machine of the class described, the combination with means for conforming fabric to be reinforced to provide a plurality of offset portions spaced transversely of the fabric, of means for inserting reinforcing strands through the said offset portions of the fabric, rotary knotter members disposed at each side of the path of travel of the fabric to receive the reinforcing strand in initial knotting position as it is inserted through said offsets, said knotter members having central openings therein adapted to receive longitudinal tie members, means for feeding said tie members so that they are delivered to said knotters in approximately the plane of the fabric to be reinforced, and means for actuating said knotters and supporting means in timed relation whereby the reinforcing strands are wrapped around said tie members in clamping engagement therewith.

24. In a machine of the class described, the combination with means for conforming fabric to be reinforced to provide a plurality of offset portions spaced transversely of the fabric, of means for inserting reinforcing strands through the said offset portions of the fabric comprising a pair of reinforcing strand stock feed rolls, a cutter at the rear of said feed rolls, a rotary knotter member disposed so that the severed reinforcing strand is delivered thereto in initial knotting position by the feed rolls, said knotter member having a central opening therein adapted to receive a flexible longitudinal cord-like tie member, means for clampingly supporting the tie member at the rear of and adjacent to said knotter, and means for actuating said knotter while the tie member is supported by said support member.

25. In a machine of the class described, the combination with means for conforming fabric to be reinforced to provide a plurality of offset portions spaced transversely of the fabric, of means for inserting reinforcing strands through the said offset portions of the fabric, a rotary member disposed so that the severed reinforcing strand is delivered thereto in initial knotting position by the feed rolls, said knotter member having a central opening therein adapted to receive a flexible longitudinal cord-like tie member, means for clampingly supporting the tie member at the rear of and adjacent to said knotter, and means for actuating said knotter while the tie member is supported by said support member.

26. In a machine of the class described, the combination with means for conforming fabric to be reinforced to provide a plurality of offset portions spaced transversely of the fabric, of means for inserting reinforcing strands through the said offset portions of the fabric, a rotary knotter member disposed so that the severed reinforcing strand is delivered thereto in initial knotting position by the feed rolls, said knotter member having a central opening therein adapted to receive a flexible longitudinal cord-like tie member, means for clampingly supporting the tie member at the rear of and adjacent to said knotter, means for feeding said tie member so that it is delivered to said knotter in approximately the plane of the fabric to be reinforced, and means for actuating said knotter while the tie member is supported by said support.

27. A machine for forming reinforced fabric material, comprising means for intermittently advancing a web of fabric longitudinally, means for forming longitudinally extending pleats in said fabric, means for intermittently advancing a pair of separate unconnected tie members parallel to the fabric and in laterally spaced relation to the sides of the fabric, and means for connecting said tie members to said fabric and to one another and for reinforcing the fabric, comprising means for successively inserting wire strands through the pleats of the fabric in a direction transverse the path of advance thereof, and means for simultaneously wrapping the opposite ends of said strands about said tie members to secure the strands thereto and the tie members to one another and to prevent relative longitudinal movement of the strands.

28. A machine for forming reinforced fabric material, comprising means for intermittently advancing a web of fabric longitudinally, means for forming longitudinally extending pleats in said fabric, means for intermittently advancing a pair of separate unconnected tie members parallel to the fabric, and means for connecting said tie members to said fabric and to one another and for reinforcing the fabric, comprising means for successively inserting wire strands through the pleats of the fabric in a direction transverse the path of advance thereof, and means for securing the opposite ends of said strands to said tie members to secure the strands thereto and the tie members to one another and to prevent relative longitudinal movement of the strands.

29. A machine for forming reinforced fabric material, comprising means for intermittently advancing a web of fabric longitudinally, means for in intermittently advancing a pair of separate unconnected tie members parallel to the fabric, and means for connecting said tie members to said fabric and to one another and for reinforcing the fabric, comprising means for weaving wire strands through the fabric in a direction transverse the path of advance thereof, and means for securing the opposite ends of said strands to said tie members to secure the strands thereto and the tie members to one another and to prevent relative longitudinal movement of the strands.

30. The method of manufacturing reinforced fabrics, comprising intermittently feeding a web of fabric and while feeding the same forming longitudinal pleats extending in the direction of feed, intermittently feeding a pair of unconnected lengths of flexible tie material separate from said fabric in a direction parallel to the feed of the fabric and in laterally spaced relation to the opposite sides thereof, successively introducing reinforcing strands through the pleats of the fabric in a direction transverse the direction of feed thereof, and simultaneously wrapping the opposite ends of said strands about said tie members to thereby maintain the tie members in spaced parallel relation and secure the strands from longitudinal movement relative to one another.

31. The method of manufacturing reinforced fabrics, comprising intermittently feeding a web of fabric and while feeding the same forming longitudinal pleats extending in the direction of feed, intermittently feeding a pair of unconnected lengths of flexible tie material separate from said fabric in a direction parallel to the feed of the fabric and in laterally spaced relation to the opposite sides thereof, successively introducing reinforcing strands through the pleats of the fabric in a direction transverse the direction of feed thereof, and connecting the opposite ends of said strands to said tie members to thereby maintain the tie members in spaced parallel relation and secure the strands from longitudinal movement relative to one another.

HUGH LEAL.